(12) United States Patent
Fujisaki

(10) Patent No.: US 11,736,641 B2
(45) Date of Patent: Aug. 22, 2023

(54) APPARATUS AND METHOD FOR CREATING IMAGES FROM DOCUMENTS

(71) Applicant: SHARP KABUSHIKI KAISHA, Sakai (JP)

(72) Inventor: Tatsuya Fujisaki, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/718,151

(22) Filed: Apr. 11, 2022

(65) Prior Publication Data

US 2022/0337717 A1  Oct. 20, 2022

(30) Foreign Application Priority Data

Apr. 20, 2021  (JP) ................................ 2021-071302

(51) Int. Cl.
*H04N 1/00* (2006.01)
(52) U.S. Cl.
CPC ..... *H04N 1/00816* (2013.01); *H04N 1/00822* (2013.01)
(58) Field of Classification Search
None
See application file for complete search history.

(56) References Cited

U.S. PATENT DOCUMENTS

| | | | | |
|---|---|---|---|---|
| 2008/0137157 A1* | 6/2008 | Bannai | ...................... | H04N 1/38 358/497 |
| 2008/0316549 A1* | 12/2008 | Bush, III | ........... | H04N 1/00681 358/488 |
| 2014/0160515 A1* | 6/2014 | Goda | .................. | H04N 1/00803 358/1.14 |
| 2015/0326743 A1* | 11/2015 | Yabuuchi | ........... | H04N 1/00591 358/498 |
| 2020/0296255 A1* | 9/2020 | Hashimoto | .......... | H04N 1/4097 |
| 2020/0336615 A1* | 10/2020 | Ono | .......................... | G06T 7/12 |
| 2021/0127025 A1* | 4/2021 | Horiguchi | ........... | H04N 1/00737 |
| 2021/0176373 A1* | 6/2021 | Sunada | ................ | H04N 1/3878 |
| 2022/0078300 A1* | 3/2022 | Sheng | ................ | H04N 1/00572 |
| 2022/0109779 A1* | 4/2022 | Hashimoto | ........ | H04N 1/00037 |

* cited by examiner

*Primary Examiner* — Dung D Tran
(74) *Attorney, Agent, or Firm* — ScienBiziP, P.C.

(57) ABSTRACT

An image reading apparatus includes: an image reading device that reads a document and an area outside the document as an image; a background color plate that is read by the image reading device in the area outside the document; a document area decision device that determines a boundary between the document and background on the basis of a density difference or a color difference between the document and the background color plate in the read image, so as to decide a document area; and an image cropping device that crops a document image from the image on the basis of the document area. In the case where both of front and back sides of the document are read and the document area of one of the sides cannot be decided, the document area decision device applies the document area of the other side.

5 Claims, 9 Drawing Sheets

APPARATUS AND METHOD FOR CREATING IMAGES FROM DOCUMENTS

BACKGROUND OF THE INVENTION

Field of the Invention

The present invention relates to an image reading apparatus and an image reading method capable of reading both of front and back sides of a document and having a function of determining a boundary between the document and background in a read image to decide a document area.

Description of the Background Art

In image reading apparatuses such as a multifunction peripheral and an image scanner, as a mode of reading a document, a mode of scanning the document that is placed on a document table (a platen mode) and a mode of transporting the document by a document feeder and reading the document (a feeder mode) are used separately. In any of the modes, a document size is input or detected, so as to only read a document area. For such a reason, a large number of image reading apparatuses has a function of detecting the document size. Normally, the document sizes detectable by the image reading apparatus are limited to so-called standard sizes such as A3, A4, A5, 11"×17", 8.5"×11", and 5.5"×8.5". In order to read the document in a non-standard size (an irregular size), a method for manually inputting vertical and horizontal sizes of the document, and the like are available.

Although the document in the irregular size may not be read frequently, it is cumbersome to manually input the document size in such an occasion. In the case where the irregular document size can accurately be detected, a cumbersome input task can be eliminated, and such elimination is convenient.

As a method for accurately detecting the irregular document size, it is considered to adopt processing in which, for example, a gray background color plate is used instead of a normal white background color plate and an area corresponding to the background color plate is cropped from a read document image. This method is based on an assumption that a normal document edge is in the same white color as a ground color of a sheet of paper. Thus, a contour of the document is determined on the basis of a density difference between the white color of the document edge and the gray color of the background color plate.

However, there is a negative side of using the gray background color plate. When the document on a thin sheet of paper is read by using the gray background color plate, the gray color of the background color plate is possibly seen through to some extent, which causes the document sheet to be read as a sheet of paper in a light gray color.

By the way, in the platen mode, undersides of the documents, which include thick documents such as a book and are placed on a transparent document table, are scanned and read. That is, single-sided reading is assumed. On the contrary, the feeder mode is based on an assumption of reading the document on the sheet of paper, and is a mode of transporting the document to a reading position and reading the document. Thus, normally, both of front and back sides of the document can be read.

The following technique of detecting the document areas in both of front and back sides has been known.

Image data of front sides of plural business cards (front-side business card image data) and positional information thereof are acquired, and image data of back sides thereof (back-side business card image data) and positional information thereof are acquired. Based on the positional information, any one piece of the back-side business card image data is associated with each of the front-side business card image data to create a single business card image. Then, the front-side business card image data and the back-side business card image data of the business card image, which are associated with each other, are compared to determine whether the positions of the image data are the same and also to determine whether these pieces of the image data are of the same image. In Japanese Patent Application Publication No. 2015-056794, in the case where the positions of the image data are the same, and these pieces of the image data are of the same image, it is detected that the business card is not turned over.

In addition, an image processing system is disclosed in Japanese Patent Application Publication No. 2006-339770. The image processing system scans and reads the front and back sides of the plural double-sided documents twice, thereafter associates image data of the front and back sides of each of the plural double-sided documents with each other, and synthesizes the associated image data. In such an image processing system, in the case where the back side is blank, the back side is removed from a scanning target, or is neither output nor synthesized.

In the case of the feeder mode, it takes time to turn over the document and read the front and back sides of the document, and a possibility of damaging the document is increased. For such a reason, an image reading apparatus is provided to read each of the front and back sides of a document surface by a dedicated image sensor. In such a case, the time required for reading the double-sided document can be shortened to the same duration of a time to read the single-sided document. In addition, there is no need to provide a transport path for turning over the document. As a result, the document is no longer damaged by being turned over.

Just as described, in the image reading apparatus including the document feeder, which reads each of the front and back sides of the document surface by the dedicated image sensor, there is a case where, while a boundary between the document and background of one of the sides can be determined and the document area thereof can be decided, a boundary between the document and background of the other side cannot be determined and the document area thereof cannot be decided.

The present invention has been made in view of the circumstance as described above and therefore provides an image reading apparatus capable of appropriately cropping a document image even in the case where a document area of only one side can be decided at the time of reading both of front and back sides of a document.

SUMMARY OF THE INVENTION

The present invention provides an image reading apparatus that includes: an image reading device that reads a document and an area outside the document as an image; a background color plate that is read by the image reading device in the area outside the document; a document area decision device that determines a boundary between the document and background on the basis of a density difference or a color difference between the document and the background color plate in the read image, so as to decide a document area; and an image cropping device that crops a document image from the image on the basis of a document area. In the case where both of front and back sides of the document are read and the document area of one of the sides cannot be decided, the document area decision device applies the document area of the other side.

From a different perspective, the present invention provides a document image reading method that causes a computer to: read, as an image, a document and a background color plate opposing in an area of the outside of the document; determine a boundary between the document and background on the basis of a density difference or a color difference between the document and the background color plate in the read image, so as to decide a document area; and apply a document area of one side to crop a document image in the case where a document area of the other side cannot be decided at the time of reading both of front and back sides of the document.

In the image reading apparatus according to the present invention, the document area decision device applies the document area of the other side in the case where both of the front and back sides of the document are read and the document area of the one side cannot be decided, and the image cropping device crops the document image on the basis of the document area. Therefore, even in the case where both of the front and back sides of the document are read and only the document area of the one side can be decided, the document image can be cropped appropriately.

The document image reading method according to the present invention also exerts similar operational effects.

DESCRIPTION OF THE PREFERRED EMBODIMENTS

A detailed description will hereinafter be made on the present invention with reference to the drawings. The following description is illustrative in all respects and should not be construed as limiting the present invention.

First Embodiment

Configuration of Image Reading Apparatus

First, a description will be made on an image reading apparatus in this embodiment.

Figure 1:
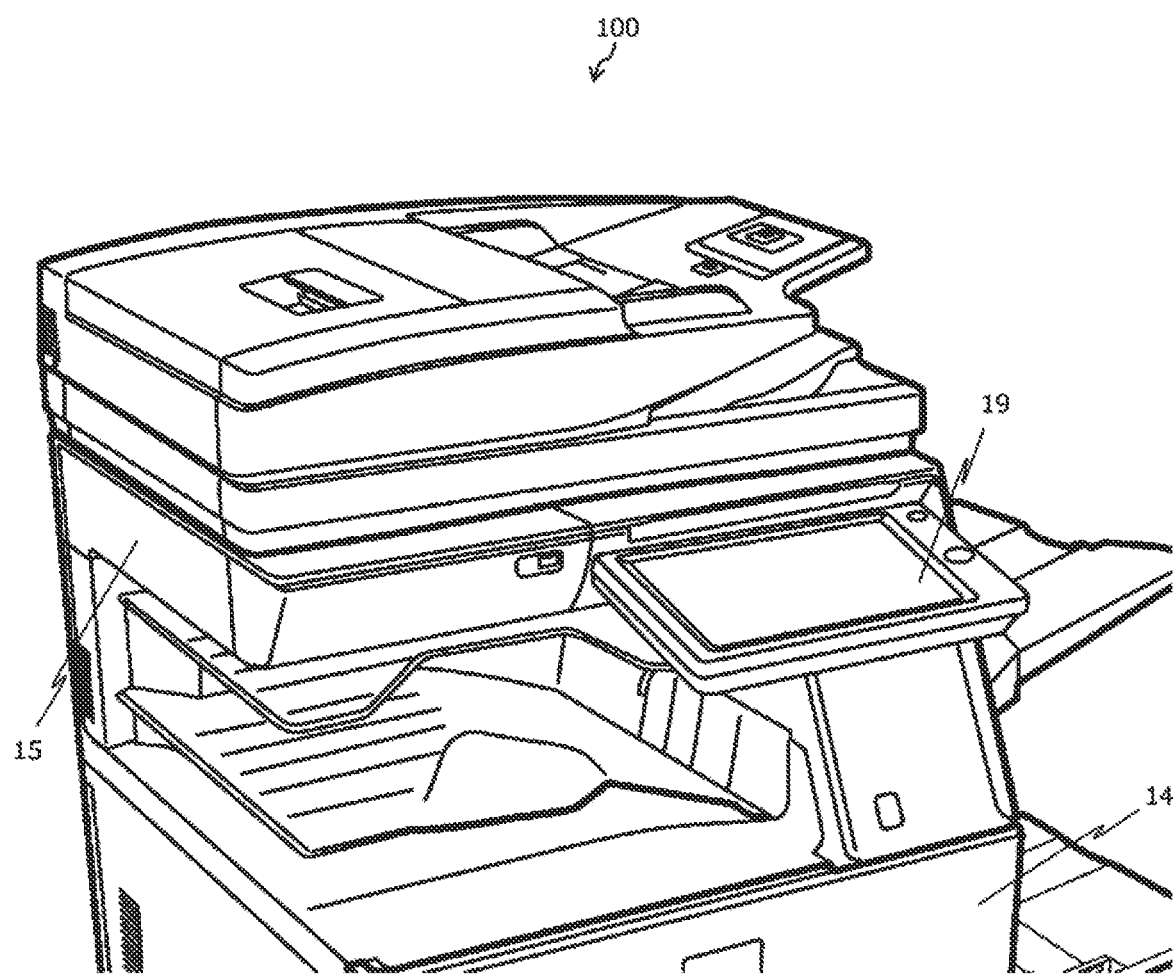
FIG. 1 is a perspective view illustrating partial external appearance of a multifunction peripheral as an aspect of an image reading apparatus in this embodiment (a state where a document feeder is closed).
Figure 2:
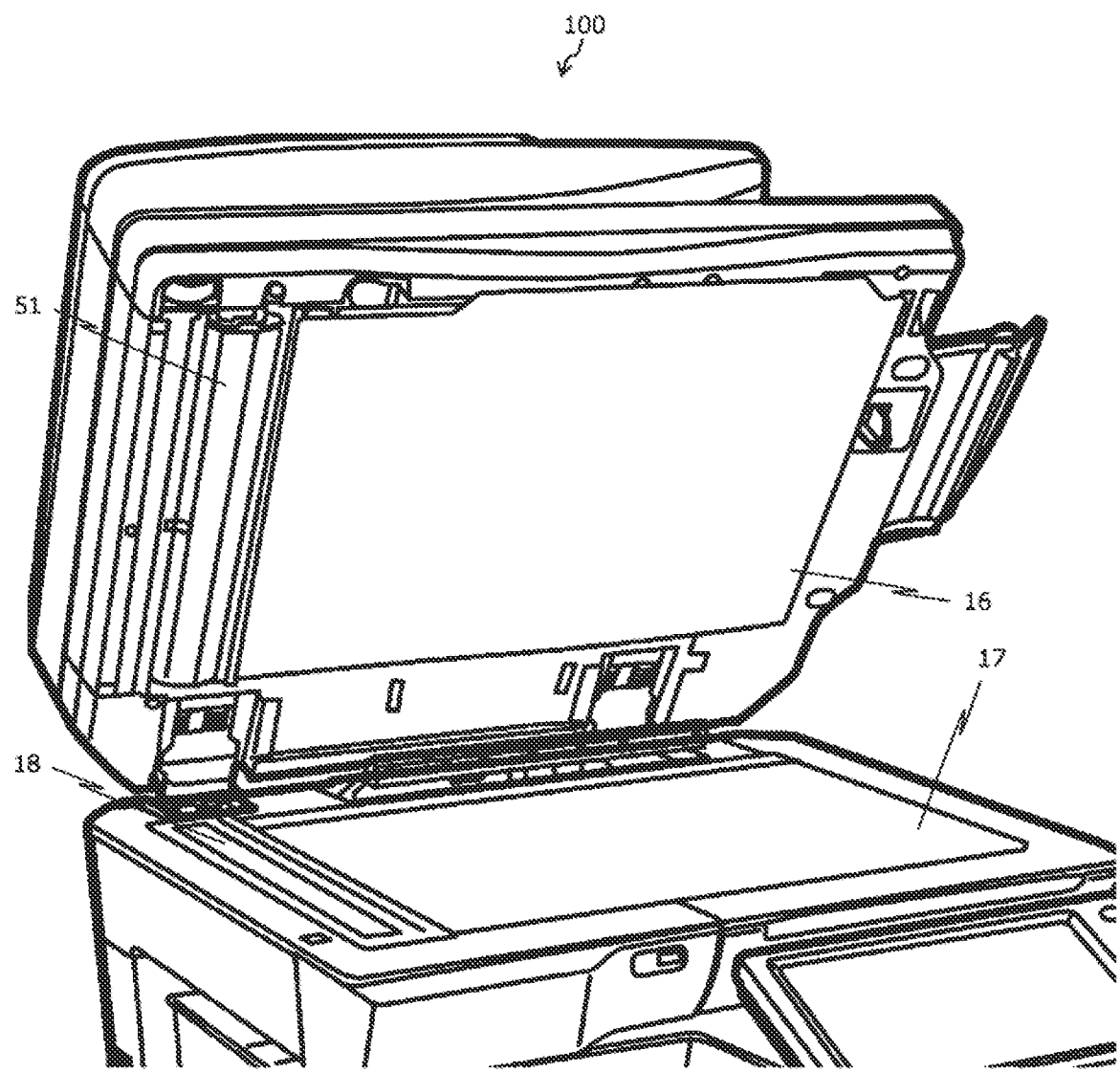
FIG. 2 is a perspective view illustrating the partial external appearance of the multifunction peripheral as the aspect of the image reading apparatus in this embodiment (a state where the document feeder is opened).
Figure 3:
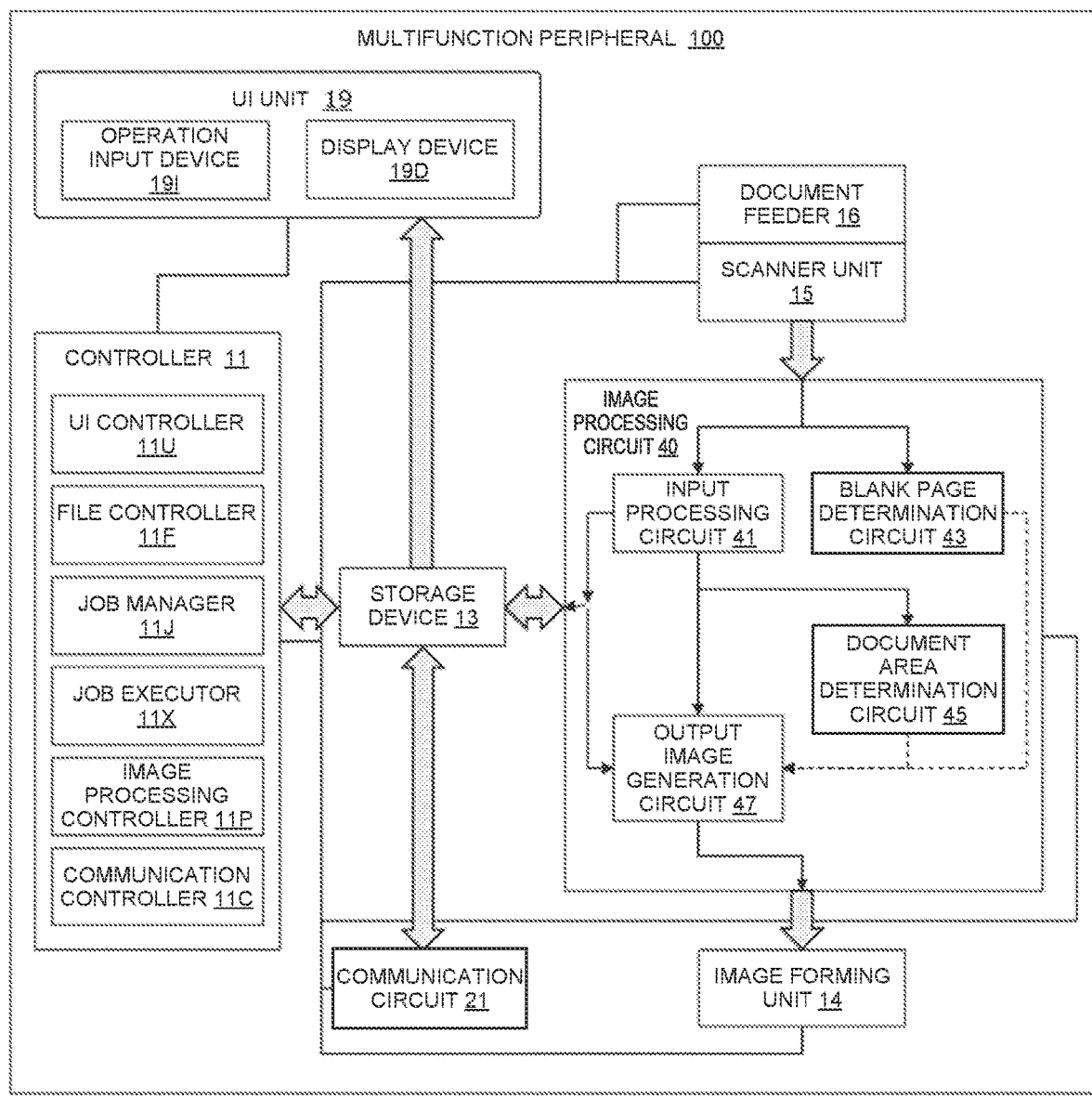
FIG. 3 is a block diagram illustrating an overall configuration of the multifunction peripheral illustrated in FIG. 1 and FIG. 2.

FIG. 1 and FIG. 2 are perspective views each illustrating partial external appearance of a multifunction peripheral as an aspect of the image reading apparatus in this embodiment. FIG. 1 and FIG. 2 each illustrate a portion associated with reading of a document. FIG. 1 illustrates a state where a document feeder is closed, and FIG. 2 illustrates a state where the document feeder is opened and a document table is exposed. FIG. 3 is a block diagram illustrating an overall configuration of the multifunction peripheral illustrated in FIG. 1 and FIG. 2.

As illustrated in the block diagram in FIG. 3, a multifunction peripheral 100 includes a controller 11, a storage device 13, an image forming unit 14, a scanner unit 15, an user interface unit 19 (also referred to as a UI unit), a communication circuit 21, and an image processing circuit 40.

The controller 11 includes a UI controller 11U, a file controller 11F, a job manager 11J, a job executor 11X, an image processing controller 11P, and a communication controller 11C. The UI unit 19 includes an operation input device 191 such as a touch panel and a display device 19D. The controller 11 controls the multifunction peripheral 100. The image processing circuit 40 includes an input processing circuit 41, a blank page determination circuit 43, a document area determination circuit 45, and an output image generation circuit 47.

As illustrated in FIG. 1, the UI unit 19 is provided on a casing of the multifunction peripheral 100.

The operation input device 191 detects a user's operation on a display screen of the display device 19D. The UI controller 11U recognizes a signal of the operation, which is detected by the operation input device 191, to recognize which element on the screen of the display device 19D has been operated.

The file controller 11F saves a file in a storage device such as a HDD, reads the file therefrom, extracts the file to a storage device such as memory, and the like.

The display device 19D is constructed of a liquid-crystal display device, for example. The display device 19D shows the screen according to control by the UI controller 11U.

The job manager 11J executes processing to register, delete, and stop various jobs such as a copy job, a scanner job, and a print job. When the job registered in the job manager 11J becomes ready for execution, the job manager 11J requests the job executor 11X to start executing the job.

The job executor 11X determines whether to start executing the job registered by the job manager 11J, and causes the image forming unit 14, the scanner unit 15, and the image processing circuit 40 to execute the job according to settings. The job executor 11X recognizes a state detected by a sensor (not illustrated) that is arranged in each of the scanner unit 15 and the image forming unit 14. Then, the job executor 11X controls operation of a motor, an actuator, a device, and the like (not illustrated) arranged in each of the scanner unit 15 and the image forming unit 14. The image processing controller 11P controls image-related processing by the image processing circuit 40. Then, the image processing controller 11P executes job-related processing such as reading, printing, and previewing a document image.

As a specific configuration aspect, the controller 11 is mainly constructed of a processor such as a central processing unit (CPU) or a micro processing unit (MPU). In addition to the processor, the controller 11 includes hardware resources such as work memory, an input/output interface circuit, and a timer circuit. The processor executes a control program that is stored in the storage device 13 in advance, and thereby executes various jobs related to operation recognition, display control, reading of the document image, printing of the image, and the like, that is, a series of processing related to image formation. A function as the controller 11 is implemented by cooperation of software resources and the hardware resources.

The storage device 13 includes volatile memory such as DRAM and non-volatile memory such as an HDD or flash memory. The storage device 13 stores the control program that is executed by the processor and the image that is read by the scanner unit 15 and processed by the image processing circuit 40. The storage device 13 further stores data on control by the file controller 11F, the job manager 11J, the job executor 11X, and the image processing controller 11P. The storage device 13 may integrally be constructed with the memory of the controller 11.

The controller 11 is connected to each of the image forming unit 14 and the scanner unit 15 in a manner capable of exchanging the data.

The communication circuit 21 is a circuit for data communication with an external device via a network.

As illustrated in FIG. 1 and FIG. 2, the multifunction peripheral 100 includes a document feeder 16. In addition, as illustrated in FIG. 2, the multifunction peripheral 100 includes a document table 17 that is exposed when the document feeder 16 is opened upward. The document table 17 is formed of a transparent glass plate and is arranged on a top surface of the scanner unit 15. As illustrated in FIG. 2, a front-side reading window 18 is arranged next to a left end of the document table 17. Similar to the document table 17, the front-side reading window 18 is formed of a transparent glass plate. A front-side background color plate 51 is arranged on a lower surface of the document feeder 16. In a state of closing the document feeder 16, the front-side reading window 18 and the front-side background color plate 51 are located at opposing positions.

The scanner unit 15 reads the image of the document under control of the job executor 11X, and converts the image of the document into a red-green-blue (RGB) color image signal (an RGB analog signal). That is, the scanner unit 15 executes processing to read the image in the copy, fax, and scanner jobs.

Figure 4:
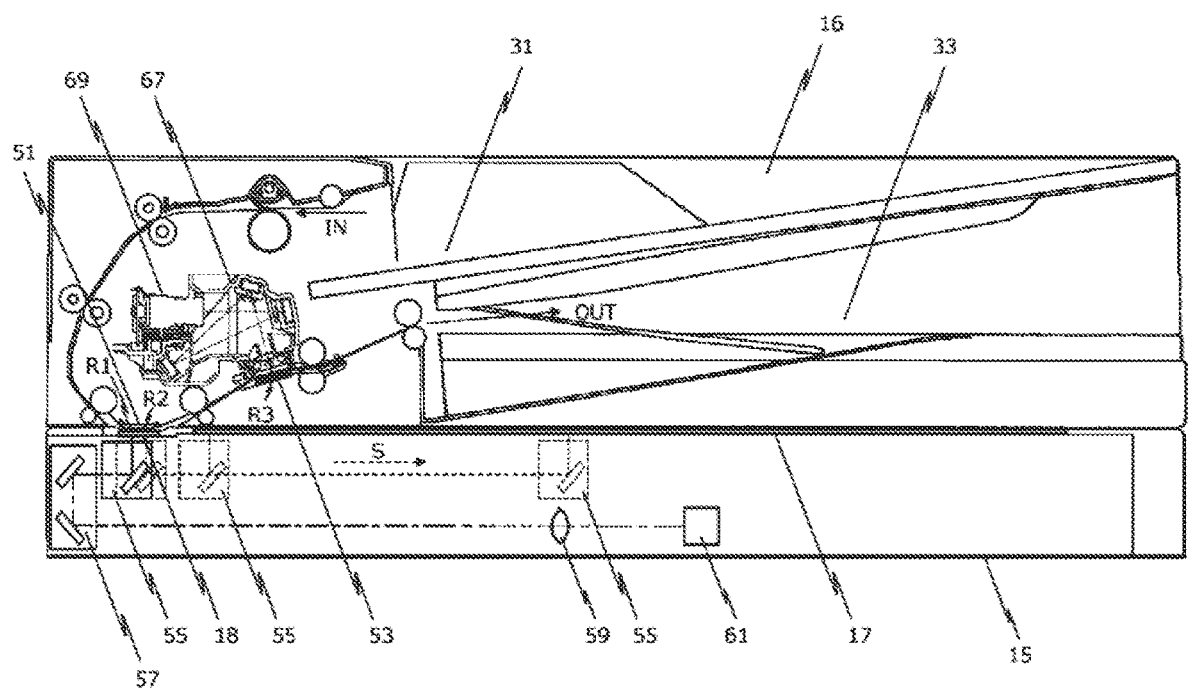
FIG. 4 is an explanatory view illustrating schematic configurations of a scanner unit and the document feeder in the multifunction peripheral illustrated in FIG. 1.

FIG. 4 is an explanatory view illustrating schematic configurations of the scanner unit 15 and the document feeder 16 in the multifunction peripheral 100 illustrated in FIG. 1.

The document feeder 16 illustrated in FIG. 4 separates and feeds the document per sheet from a stack of the documents placed on a document set tray 31 (see an arrow IN illustrated in FIG. 4), transports the document through front-side reading positions R1, R2 and a back-side reading position R3, and discharges the document to a document output tray 33 (see an arrow OUT illustrated in FIG. 4). Here, in the document set tray 31, the document is set with the front side facing down. In this way, in a mode of reading only one side (the front side) of the document, the reading positions R1, R2 can be switched.

The front-side reading positions R1, R2 are positions located between the lower front-side reading window 18 and the upper front-side background color plate 51. At the reading positions R1, R2, the transported document is exposed below the front-side background color plate 51.

As illustrated in FIG. 4, the scanner unit 15 stops a first carriage 55 at any of the reading positions R1, R2, and reads the front side of the passing document. An LED and a reflective mirror for illuminating a document surface are mounted on the first carriage 55, and two reflective mirrors are mounted on a second carriage 57. An image of the document that passes through the reading position R1 or R2 is formed by an image sensor 61 through those reflective mirrors and an optical lens 59. The first carriage 55 can move below the document table 17. In a platen mode, as indicated by an arrow S in FIG. 4, the first carriage 55 scans and reads the document, which is placed on the document table 17, from below. When the first carriage 55 moves, the second carriage 57 moves in the same direction at half a speed of the first carriage 55, and causes the image sensor 61 to form the image of the document, which is placed on the document table 17. The image sensor 61 outputs an image signal that corresponds to the document image. The reflective mirrors of the first carriage 55 and the second carriage 57 and the optical lens 59 constitute a reduction optical system that causes the image sensor 61 to form the image of the front side of the document.

Figure 5:
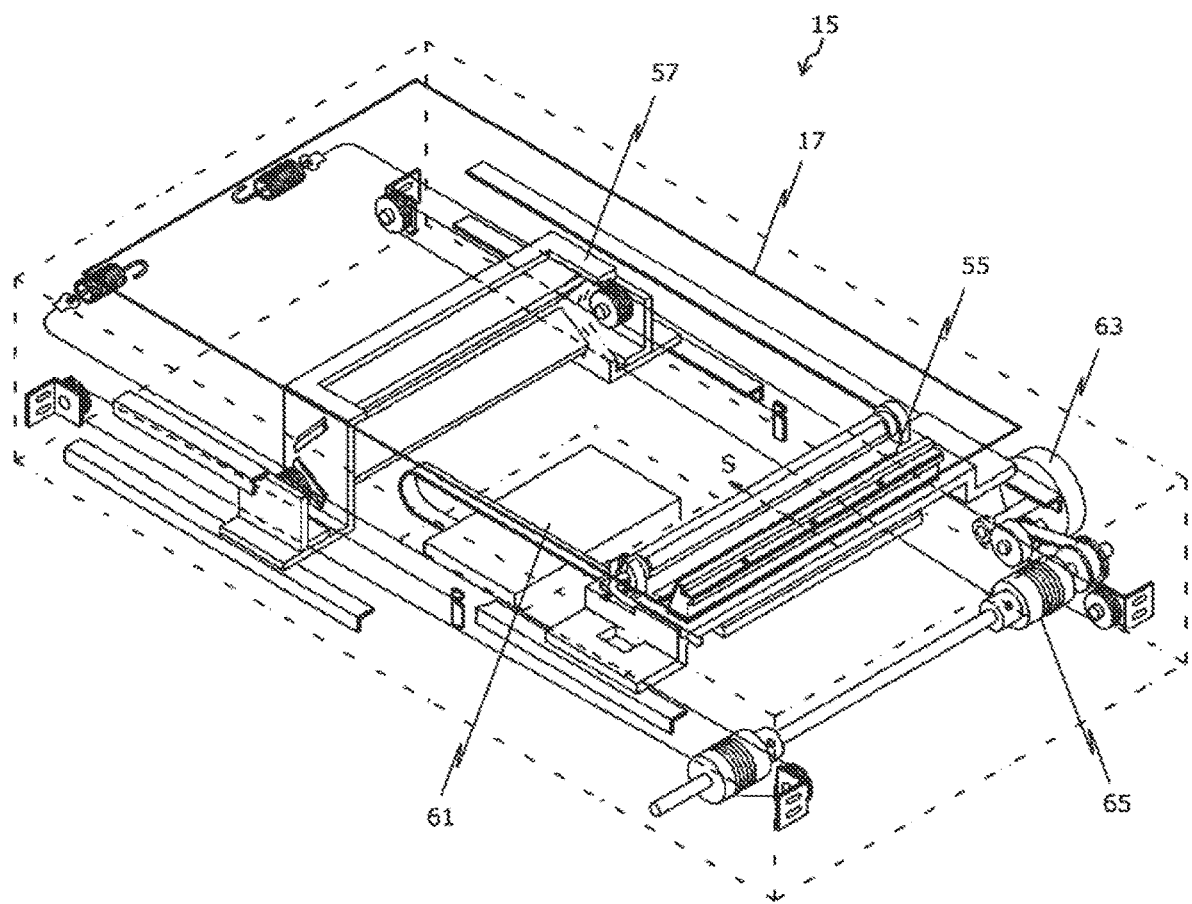
FIG. 5 is an explanatory view illustrating a configuration of a mechanism for moving a first carriage and a second carriage in the scanner unit illustrated in FIG. 4.

FIG. 5 is an explanatory view illustrating a configuration of a mechanism that causes the first carriage 55 and the second carriage 57 in the scanner unit 15 illustrated in FIG. 4 to move. FIG. 5 is a perspective view in which the scanner unit 15 is seen obliquely downward from the left and the rear. As illustrated in FIG. 5, a wire is fixed to each end of the first carriage 55. Each end of the second carriage 57 has a pully, around which the wire is hung. The wire is wound around a wire pulley 65 that is rotationally driven by a scanner motor 63. When the wire pulley 65 rotates, such rotation causes the first carriage 55 and the second carriage 57 to move in the arrow S direction or move in an opposite direction. The second carriage 57 moves like a dynamic pulley at half the speed of the first carriage 55.

The description will be referring back to FIG. 4. A back-side reading unit 67 to read the back side of the document and a back-side background color plate 53 are arranged at the reading position R3. The back-side reading unit 67 causes an image sensor in a lens/image sensor unit 69 to form the image of the back side of the document, which passes through the reading position R3, through plural reflective mirrors provided to the back-side reading unit 67. The image sensor outputs an image signal that corresponds to the document image. The lens/image sensor unit 69 is a unit in which an optical lens and a line image sensor are assembled integrally. The plural reflective mirrors of the back-side reading unit 67 and the optical lens of the lens/image sensor unit 69 constitute a reduction optical system that causes the image sensor of the lens/image sensor unit 69 to form the image of the back side of the document.

The back-side reading unit 67 is located on an inner side of a substantially U-shaped document transport path. Accordingly, the front side of the document, which is transported by the document feeder 16, is read by the scanner unit 15 while the back side of such a document is read by the back-side reading unit 67.

The image processing circuit 40 generates image data on the basis of the image signal output from the scanner unit 15. Alternatively, the image processing circuit 40 generates the image data for printing on the basis of print data that is received via the communication circuit 21. The image processing controller 11P controls those types of the processing by the image processing circuit 40. One or plural pieces of the generated image data are compiled per page, per pages of the front and back sides, or per copy of the document into an image file. The file controller 11F executes processing to generate and manage the image file from the image data, and executes control related to reading and writing of the image file. The image data is printed by the image forming unit 14 or sent to the external device via the communication circuit 21.

FIG. 3 illustrates a configuration of the image processing circuit 40 for image processing according to the present invention. Blocks illustrated in FIG. 3 do not cover the entire image processing circuit 40, but only represent essential elements for the description of the present invention.

The input processing circuit 41 executes the image processing when receiving the image signal per page from the image sensors (the image sensor 61 for reading the front side and the lens/image sensor unit 69 for reading the back side) in the scanner unit 15. Then, the input processing circuit 41 as a circuit block generates an original image of an image for determination of a document area and an image for output. The input processing circuit 41 performs A/D conversion, shading correction, and gradation conversion, and the like of the image signal.

The blank page determination circuit 43 is a circuit block that counts a percentage of black pixels included in the image signal per page received from the scanner unit 15 and thereby determines a blank page. The determination result is provided to the output image generation circuit 47, and is used for control to suppress output of the blank page.

The document area determination circuit 45 is a circuit block that determines the document area of the read image on the basis of the image for determination output from the input processing circuit 41. In a mode of determining the document area in an irregular size, the document area determination circuit 45 decides the rectangular document area of the basis of a density difference or a color difference between a color of a document edge and a gray color of the background color plate. The determination of the document area is made to determine a contour of the rectangular document. Thus, in order to reduce a processing load, the image for determination can be an image that is acquired by reducing resolution of the read image and converting the read image into a black and white binary picture, for example. In this embodiment, when deciding the rectangular document area, the document area determination circuit 45 not only detects the contour of the document but also executes character recognition processing to detects a tilt and top and bottom sides of the document. Then, by taking into account those results, the document area determination circuit 45 decides the document area. The decided document area is provided to the output image generation circuit 47, and is used for cropping processing of the output image.

The output image generation circuit 47 further executes the image processing on the output image that is output from the input processing circuit 41, and generates an image file in a format to be output. The image processing executed by the output image generation circuit 47 includes processing to skip the blank page on the basis of the determination result by the blank page determination circuit 43. The image processing executed by the output image generation circuit 47 further includes the cropping processing of the image of each of the pages on the basis of the document area decided by the document area determination circuit 45. In addition to the above, image processing executed by the output image generation circuit 47 includes image quality adjustment, color correction, spatial filter processing, displacement processing, and the like. For example, when sending the image of the read document, as the image file in a PDF format, to a specified destination via the communication circuit 21, the output image generation circuit 47 generates the image file in the PDF format from the image data of each of the pages, and outputs the image file.

Case where Document Area of One of Front and Back Sides Cannot be Decided by Double-Sided Reading in Feeder Mode A description will be made on an example of a case where the document area of one of the front and back sides cannot be decided by double-sided reading in a feeder mode. A description will herein be made on the decision of the document area of the document in the irregular size.

In a mode of reading the document in the irregular size, the image reading apparatus detects a document size, and determines which of detectable standards sizes the detected document size is close to. Then, the image reading apparatus reads the document in an area that is one size larger than the detected standard size. Next, the image reading apparatus crops an area other than the document, that is, an area corresponding to the background color plate from the read image.

In general, the document edge is white. Thus, a white background color plate is used not to give a sense of discomfort even when an area outside the document is read. However, in a mode of detecting the document area of the document in the irregular size, correct detection of the document area is prioritized. Accordingly, the document is read by using a gray background color plate, and the contour of the document is determined on the basis of the density difference or the color difference between the gray color of the background color plate and the color of the document edge.

In the above-described multifunction peripheral 100, a mechanism of the scanner unit 15 for reading the front side of the document in the feeder mode has a common configuration with that in the platen mode. It is easy to shift the reading position of the front surface between the mode of reading the document in the standard size and the mode of reading the document in the irregular size by changing stop positions of the first carriage 55 and the second carriage 57. Accordingly, the front-side background color plate 51 is painted to have a white portion and a gray portion such that the front-side background color plate 51 is in white at the reading position R1 and in gray at the reading position R2.

By taken into account rationality of reading a single-sided document in the irregular size, the scanner unit 15, whose reading position can easily be shifted, is primarily used in the feeder mode to read the document. In a case of the double-sided reading, the scanner unit 15 is used to read only the front side. Here, it is not essential to paint the portion of the front-side background color plate 51 at the reading position R1 in white and paint the portion thereof at the reading position R2 in gray. The portion of the front-side background color plate 51 at the reading position R1 may be painted in gray while the portion thereof at the reading position R2 is painted in white. However, the former is adopted herein. In addition, use of the gray color is not essential, and a color other than white may be used. However, the gray color is used herein.

It is possible to switch, between valid and invalid, the mode of determining the document area in an irregular size, based on a user operation or the like. That is, if the mode of determining the document area is invalid, i.e., in the mode of reading the document in the normal standard size, the controller 11 controls the first carriage 55 such that the first carriage 55 stops at the reading position R1 and reads the front side of the document. The reading position R1 is the position where the front-side background color plate 51 is in white. Meanwhile, if the mode of determining the document area is valid, i.e., in the mode of reading the document in the irregular size, the controller 11 controls the first carriage 55 such that the first carriage 55 stops at the reading position R2 and reads the front side of the document. The reading position R2 is the position where the front-side background color plate 51 is in gray. Shifting of the reading position of the document according to the mode can be achieved by simply changing the stop position of the first carriage 55, which is also used in the platen mode, and the stop position of the second carriage 57. Thus, mechanism-related and cost-related burdens to achieve such shifting are insignificant.

Meanwhile, it is configured that the back side of the document is read by using the back-side reading unit 67 fixed to the inside of the document feeder 16. The back-side reading unit 67 is not provided with a mechanism for shifting the reading position R3 or the back-side background color plate 53. It is not theoretically impossible to exert a similar function to that for the front side by providing a mechanism for shifting the background color plate so as to switch the color of the background color plate between white and gray according to the mode of reading the document in the standard size and the mode of reading the document in the irregular size in a similar manner to the mechanism for the front side. However, adding the function of shifting the reading position to read the document in the irregular size, which rarely occurs, poses the significant mechanism-related and cost-related burdens. For such a reason, the back-side reading unit 67 and the back-side background color plate 53 are fixed at the reading position R3.

As in this embodiment, in the image reading apparatus including the document feeder that reads each of the front and back sides of the document surface by the dedicated image sensor, in the mode of reading the document in the irregular size, the document area of the front side thereof can be decided at the reading position that corresponds to the gray background color plate. Meanwhile, since the back side thereof is read by using the white background color plate, a boundary between the document and the background may not be determined, and thus the document area may not be decided.

Processing in Case where Document Area of One of Front and Back Sides Cannot be Decided In this embodiment, in the case where the document area of one of the front and back sides of the document cannot be decided, the document area of the other side is applied thereto, and the cropping processing is executed.

As a specific example thereof, a description will be made on a case where, for double-sided reading in the feeder mode, the mode of detecting the document area of the document in the irregular size is combined with a blank page skipping function, that is, a blank page determination function.

The blank page skipping function is a function of skipping the blank page and outputting the pages other than the blank page of the document in the case where there is the blank page in the read document. The image processing controller 11P and the image processing circuit 40 determine whether each of the pages of the document is blank, and execute control to suppress output of the blank page.

When the blank page skipping function is set, the blank page determination circuit 43 illustrated in FIG. 3 determines whether each of the pages of the document read by the scanner unit 15 is blank. Since the output of the page that is determined to be blank is suppressed, there is no need to generate the output image of such a page. Accordingly, it can be said that, in regard to such a page, the image processing controller 11P does not have to cause the input processing circuit 41 and the output image generation circuit 47 to execute the image processing and does not have to store the image data of such a page in the storage device 13.

However, in this embodiment, even in the case where the front side is determined as the blank page, the image processing controller lip causes the input processing circuit 41 and the document area determination circuit 45 to execute the same image processing as that in a case where the front side is not the blank page. However, since the output of the blank page is suppressed, the output image generation circuit 47 does not have to execute the image processing. Then, the decided document area is stored in the storage device 13. In the case where it is determined that the back page is not blank, the document area decided for the front side is applied to the back side, and the cropping processing of the back side is executed. Then, the cropped image of the back side is included in the image file and is output.

FIG. 6 to FIG. 9 are flowcharts illustrating processing that is related to document reading and is executed by the controller 11 in this embodiment. This processing is reading processing at the time when, for the double-sided reading in the feeder mode, the detection of the document area of the document in the irregular size is combined with the blank page skipping function. A description will hereinafter be made on a processing procedure executed by the controller 11 according to the flowcharts.

Figure 6:
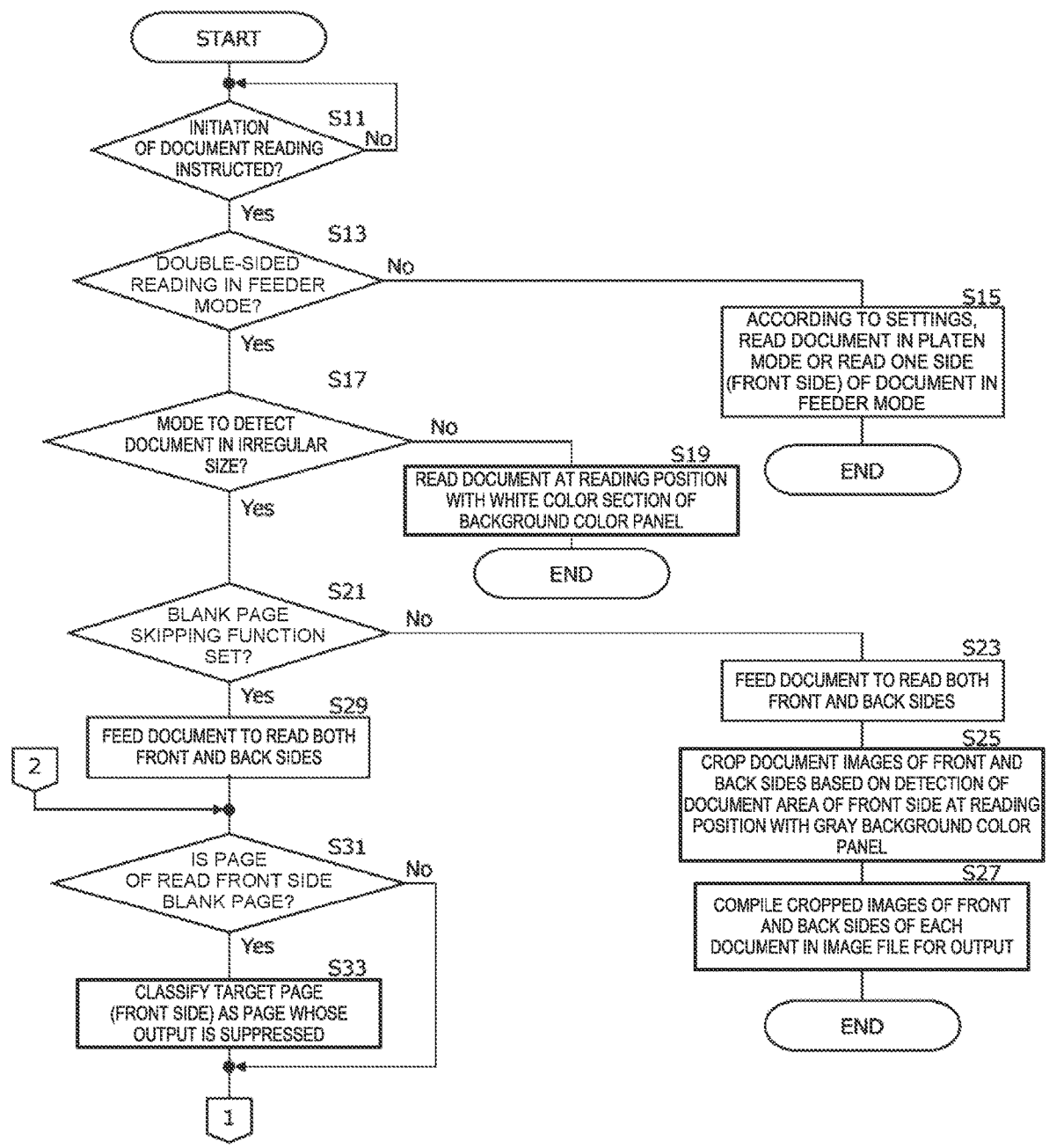
FIG. 6 is a first flowchart illustrating document reading processing that is executed by a controller in this embodiment.
Figure 7:
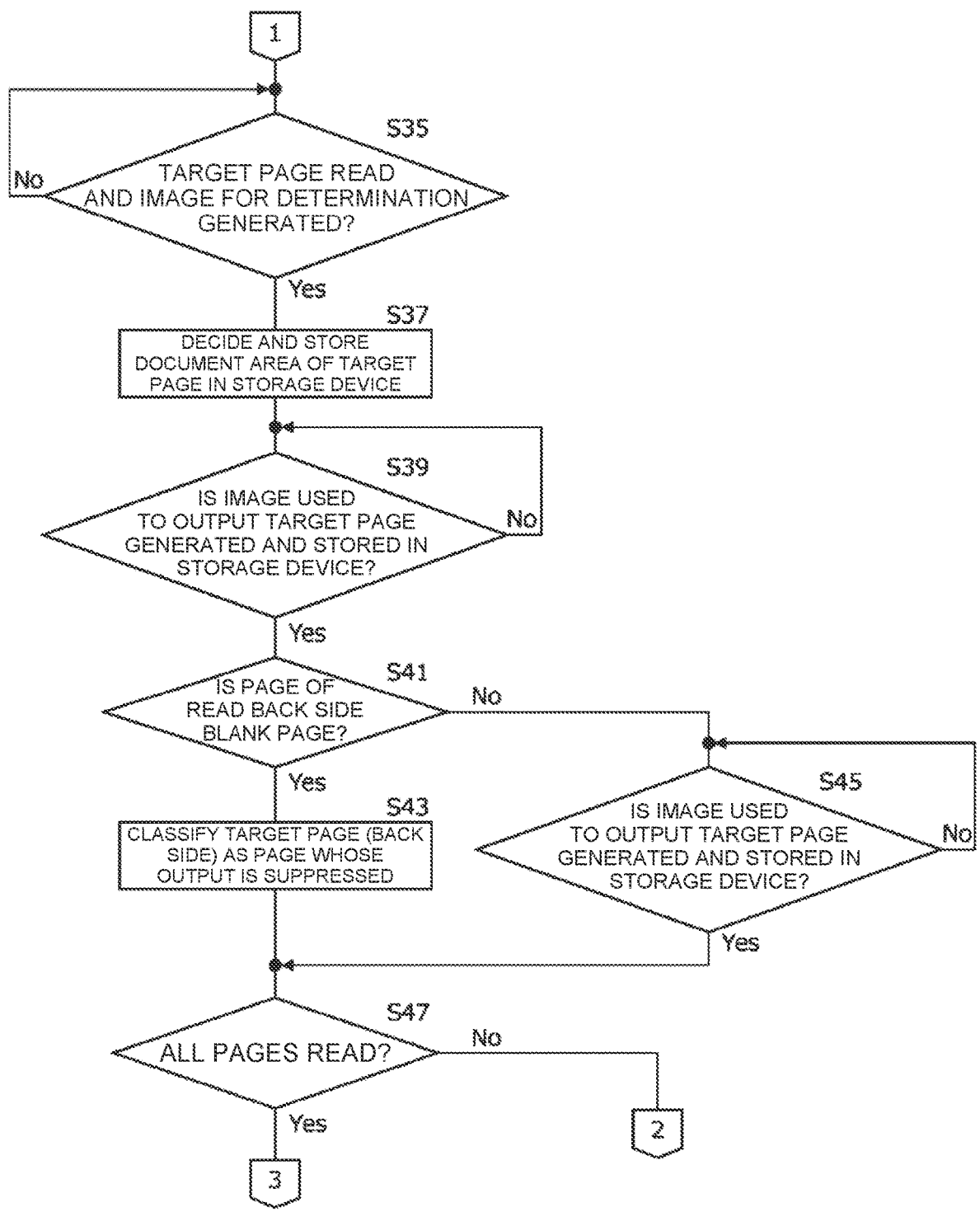
FIG. 7 is a second flowchart illustrating the document reading processing that is executed by the controller in this embodiment.

As illustrated in FIG. 6, the controller 11 as the UI controller 11U detects an instruction to initiate the job to read the document (the scanner job, the copy job, or the like) (Step S11). If the initiation of the job to read the document is instructed (Yes in step S11), the job manager 11J registers the job, the execution of which is instructed, as the job to be executed. Then, the job manager 11J requests the job executor 11X to execute the job. In response thereto, the job executor 11X executes processing according to job settings.

As the processing according to this embodiment, the controller 11 as the job executor 11X determines whether the job is to read both of the sides of the document in the feeder mode (Step S13). If the job is in the platen mode or the job is to read only one side of the document in the feeder mode (No in step S13), the controller 11 executes the processing to read the document according to the settings (Step S15). Since this processing is not job execution processing closely related to this embodiment, a detailed description thereon will not be made. In the feeder mode, the document is read at the reading position R1. At the reading position R1, the front-side background color plate 51 is in white. Then, the job execution is completed.

On the other hand, if it is determined in step S13 that the job is to read both of the sides of the document in the feeder mode (Yes in step S13), the controller 11 as the job executor 11X determines whether the current mode is a mode of detecting the document in the irregular size (Step S17).

If the current mode is a mode of only detecting the document in the standard size (No in step S17), the controller 11 executes the processing to read the document according to the settings (step S19). Since this processing is not the job execution processing closely related to this embodiment, a detailed description thereon will not be made. In this case, the front side of the document is read at the reading position R1. At the reading position R1, the front-side background color plate 51 is in white. Then, the job execution is completed.

If it is determined in above-described step S17 that the current mode is the mode of detecting the document in the irregular size (Yes in Step S17), the controller 11 as the job executor 11X determines whether the blank page skipping function is set (Step S21).

If the blank page skipping function is not set (No in step S21), the controller 11 as the job executor 11X feeds the document from the document set tray 31 in the document feeder 16, and causes the scanner unit 15 and the back-side reading unit 67 to read the front side and the back side of the document, respectively. At this time, the controller 11 controls the scanner unit 15 such that the scanner unit 15 reads the front side at the reading position R2. The reading position R2 is the position where the front-side background color plate 51 is in gray.

The controller 11 as the image processing controller 11P controls and causes the input processing circuit 41, the document area determination circuit 45, and the output image generation circuit 47 in the image processing circuit 40 to execute the image processing on the images of the front and back sides of each of the documents read by the scanner unit 15. The document area determination circuit 45 decides the document area on the basis of the image of the front side read at the reading position R2, also applies the document area to the back side, and causes the output image generation circuit 47 to crop the images of the front and back sides of each of the documents. Then, the cropped images of the front and back sides of each of the documents are compiled into the image file and output (step S27). Then, the job execution is completed.

If the blank page skipping function is set in the determination in above-described step S21 (Yes in step S21), the controller 11 as the job executor 11X controls the document feeder 16 to transport the document per sheet and read the front and back sides thereof (step S29), and executes processing in step S31 onward.

A description will hereinafter be made on the processing to read the front and back sides of each of the documents in the case where the detection of the document in the irregular size and the blank page skipping function are set for the double-sided reading in the feeder mode. The front side of the document is read by the scanner unit 15, and the back side of the document is read by the back-side reading unit 67 in parallel. However, in the description of the flowchart, the front side and the back side are read in this order for convenience of description.

The controller 11 as the image processing controller 11P waits until the front side of the document is read, and then checks whether the blank page determination circuit 43 has determined that the front side of the document is the blank page (Step S31). If it is determined that the front side of the document is the blank page (Yes in step S31), the controller 11 notifies the output image generation circuit 47 to suppress output of the image of the front side (step S33). For example, by using a data table (not illustrated) used to manage the image of each of the read pages of the document, an attribute indicating that the output of a target page should be suppressed is added. If it is determined that the front side of the document is not the blank page (No in step S31), the processing to suppress output of the target page is not executed.

Next, the controller 11 as the image processing controller 11P waits until the front side of the document is read and the document area determination circuit 45 generates the image for determination that is used to decide the document area (Yes in step S35 illustrated in FIG. 7), and then decide the document area of the basis of the image for determination. Then, data on the position of the decided document area is stored in the storage device 13 (Step S37).

Furthermore, the controller 11 as the image processing controller 11P waits until the front side of the document is read, the input processing circuit 41 executes the image processing on the image data of the page, and the processed image data is stored in the storage device 13 (step S39).

Once the image data of the target page is stored in the storage device 13, the controller 11 executes the processing to read the back page of the document.

The controller 11 as the image processing controller 11P waits until the back side of the document is read, and then checks whether the blank page determination circuit 43 has determined that the back side of the document is the blank page (Step S41). If it is determined that the back side of the document is the blank page (Yes in step S41), the controller 11 notifies the output image generation circuit 47 to suppress output of the image of the back side (step S43). For example, by using the data table (not illustrated) used to manage the image of each of the read pages of the document, an attribute indicating that the output of the target page should be suppressed is added. If it is determined that the back side of the document is not the blank page (No in step S41), the processing to suppress output of the target page is not executed.

If it is determined in step S41 that the back side of the document is not the blank page (No in step S41), the controller 11 as the image processing controller 11P waits until the back side of the document is read, the input processing circuit 41 executes the image processing on the image data of the page, and the processed image data is stored in the storage device 13 (Yes in step S45).

When the front and back sides of the single document are read, and the image data of the front and back sides is stored in the storage device 13, just as described, the controller 11 as the job executor 11X determines whether reading of all the fed documents is completed (step S47).

If the document to be read remains (No in step S47), the controller 11 returns the processing to step S31 in FIG. 6, and repeats the processing to read the front and back sides of the next document.

Figure 8:
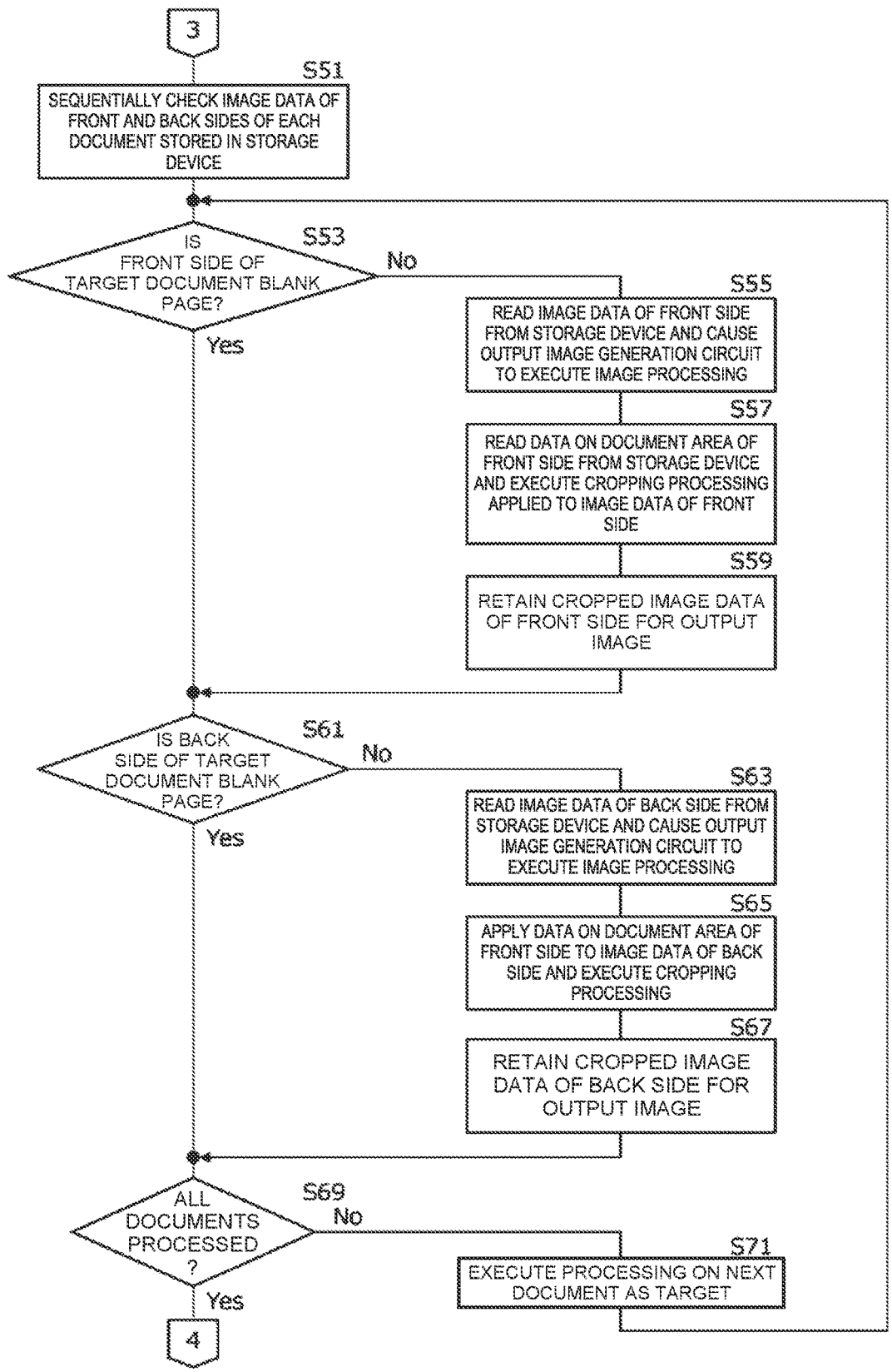
FIG. 8 is a third flowchart illustrating the document reading processing that is executed by the controller in this embodiment.

If reading of all the documents is completed (Yes in step S47), the controller 11 as the image processing controller 11P executes processing to sequentially output the image data of each of the documents (step S51 illustrated in FIG. 8). Here, the image data is acquired by reading the front and back sides of each of the documents and is stored in the storage device 13.

First, it is checked whether the front side of the target document is determined as the blank page (step S53). If the front side is the blank page (Yes in step S53), the processing proceeds to step S61, which will be described below, to make a determination on the back side.

If the front side is not the blank page (No in step S53), the controller 11 as the image processing controller 11P reads the image data of the front side of the target document from the storage device 13, and causes the output image generation circuit 47 to execute the image processing thereon (step S55).

Furthermore, the controller 11 reads the data on the document area of the front side of the target page, which is stored in the storage device 13, applies such data to the image data of the front side, and executes the cropping processing (step S57). Then, the image data of the cropped front side data is retained for use as the output image (Step S59).

Next, it is checked whether the back side of the target document is determined as the blank page (step S61). If the back side is the blank page (Yes in step S61), the processing proceeds to step S69, which will be described below, to determine whether all the pages have been processed.

If the back side is not the blank page (No in step S61), the controller 11 as the image processing controller 11P reads the image data of the back side of the target document from the storage device 13, and causes the output image generation circuit 47 to execute the image processing thereon (step S63).

Furthermore, the controller 11 applies the data on the document area of the front side of the target page to the image data of the back side, and executes the cropping processing (step S65). Then, the image data of the cropped back side data is retained for use as the output image (Step S67).

When output processing of the front and back sides of the target document is completed, it is determined whether all the documents have been processed (Step S69). If the document that has not been output remains (No in step S69), the controller 11 sets the next document as the target (step S71), returns the processing to step S53, and executes, for the next target document, the output processing of the image data of the front and back sides.

Figure 9:
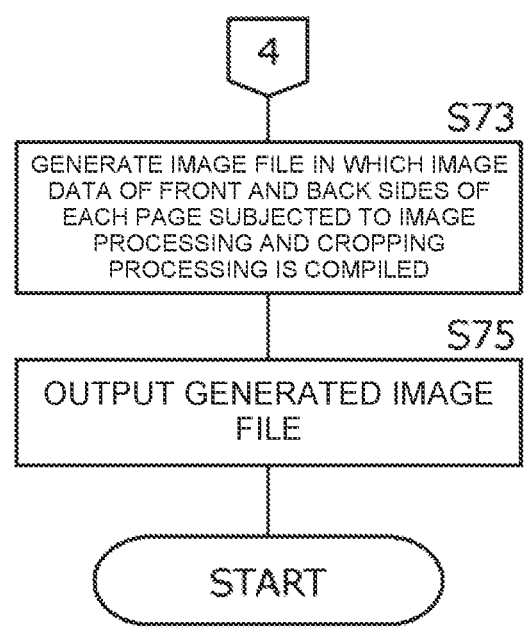
FIG. 9 is a fourth flowchart illustrating the document reading processing that is executed by the controller in this embodiment.

On the other hand, if it is determined in step S69 that all the documents have been processed (Yes in step S69), the controller 11 as the image processing controller 11P generates the image file in which the images of the front and back sides of each of the documents, each of which has been subjected to the image processing and the cropping processing, are compiled (step S73 illustrated in FIG. 9). Then, the generated image file is output (Step S75). For example, the image file is sent to the specified destination via the communication circuit 21. Then, the job execution is completed.

The description has been made so far on the processing that is executed by the controller 11 in this embodiment.

Second Embodiment

In the first embodiment, the description has been made on the aspect in which the document is read at the reading position with the gray background color plate in the mode of detecting the document area of the document in the irregular size and in which the document is read at the reading position with the white background color plate when only the document in the standard size is detected. However, an aspect of not switching the reading position according to the mode is also included in the scope of the present invention. An example of such an aspect is that the white background color plate is used for the front side and the gray background color plate is used for the back side.

According to this aspect, in regard to the single-sided reading and reading of the front side in the double-sided reading, the document is read by using the white background color plate. The back side of the document in the double-sided reading is read by using the gray background color plate. However, it is considered that the document sheet, both of the sides of which are printed, is not extremely thin, and thus the gray background color plate has a low impact. Meanwhile, the thin single-sided document is read by using the white background color plate.

Third Embodiment

In the determination of the document area, the contour of the rectangular document is determined. Thus, in the case where the document is transported and read in a tilted state, the contour that is tilted to a main scanning direction is detected.

To handle such a problem, a document area decision device may correct the tilt of the document on the basis of the contour of the document that is detected at the time of deciding the document area of each of the front and back sides.

As it has been described so far, (i) the image reading apparatus according to the present invention includes: an image reading device that reads, as the image, the document and the area outside the document; the background color plate that is read by the image reading device in the area outside the document; the document area decision device that determines the boundary between the document and the background on the basis of the density difference or the color difference between the document and the background color plate in the read image, so as to decide the document area; and an image cutter that crops the document image from the image on the basis of the document area. In the case where both of the front and back sides of the document are read and the document area of one of the sides cannot be decided, the document area decision device applies the document area of the other side thereto.

In the present invention, the background color plate is a member that is arranged on the back of the document in a reading area where the image reading device can read the document and that is exposed to the area without the document when the document in the smaller size than the reading area is read. For example, a specific aspect of the background color plate that corresponds to the feeder mode is an elongated plate member that is arranged at the reading position, at which the transported document is read. A dimension of the background color plate in a longitudinal direction is larger than a readable area in the main scanning direction of the image reading device. A specific aspect of the background color plate that corresponds to the platen mode is a flat plate member that is arranged on a lower surface of a cover (a document cover) that can be opened/closed to cover the transparent document table, on which the document to be read is placed, from above. A white member, which is in the same color as a ground color of the normal document, is generally used such that the read image does not look strange even in the case where the document is in the irregular size or the document is placed slightly out of the specified position on the document table. However, the color is not limited to white.

The image reading device scans the document and reads the image. For example, as a specific aspect thereof, a linear image sensor such as a charge-coupled device (CD) or a contact image sensor (CIS) is generally used. In general, since the documents in up to A3 or A4 size are the reading targets, use of an area image sensor increases sizes of the reduction optical system and the sensor. To handle such a problem, the linear image sensor is used, and a scanning mechanism that relatively moves the document to the image sensor in a secondary scanning direction is used, so as to downsize the entire device. In the feeder mode, generally, the reading position of the image sensor in the secondary scanning direction is fixed, and the document is transported, moved, and read. In the platen mode, generally, the document is fixed onto the document table, and the reading position is moved. In the case of the CIS, the image sensor is mounted on the carriage to move the reading position in the secondary scanning direction. In the case of the CCD image sensor, the mirror constituting the reduction optical system is mounted on the carriage to move the reading position in the secondary scanning direction.

Furthermore, the document area is the area corresponding to the document in the readable area by the image sensor. The readable area by the image sensor is usually a slightly larger area than the document in a maximum readable size. This is because an adjustment tolerance of the document transport mechanism or the optical system is expected. The image reading apparatus crops the document area, which corresponds to the detected or set document size, from document area.

Cropping the document area means to make the image to be output, that is, the image to be printed or sent correspond to the document area. In the case where the size of the image to be output is larger than the size of the document area, the image is output by filling an area of the outside of the document area with specified pixels (usually, white pixels).

Furthermore, a description will be made on a preferred aspect of the present invention.

(ii) The image reading apparatus further includes: a blank page determination device that performs the blank page determination function to determine whether the document read by the image reading device is the blank page and suppresses the output of the blank page; and a function setting device that accepts the user's setting of whether to validate the blank page determination function. The document area decision device decides the document area of each of the pages regardless of whether the document is the blank page when the blank page determination function is valid, and may apply the document area of the other side when the document area of the one side cannot be decided.

Since the blank page determination function suppresses the output of the blank page, there is no significance in deciding the document area of the blank page when the blank page determination function is set. However, with such a configuration, even in the case where the other page is blank at the time of reading both of the front and back sides of the document, and the document area of the one side cannot be decided, the document area of the blank page can be applied.

(iii) The image reading device includes: a document transport mechanism that transports the document; a first side reading device that reads one of the front and back sides of the document; a first-side background color plate that corresponds to the first side reading device and has the position in the gray color and the position in the white color on the surface; a second surface reading device that reads the other side of the document; the second-side background color plate that corresponds to the second surface reading device; and a reading position switcher that switches the reading position of the first-side background color plate by the first side reading device according to whether the blank page determination function is valid. The first-side background color plate may have the exposed surface with the white area and the gray area. The reading position switcher may switch the reading position of the first side reading device such that the position in the gray color of the first-side background color plate is read in the area without the document when the blank page determination function is valid and that the position in the white color is read when the blank page determination function is invalid.

With such a configuration, by switching the reading position of the first-side reading device, the first-side background color panel can read the position in the gray color in the area without the document when the blank page determination function is valid, and can read the position in the white color when the blank page determination function is invalid.

(iv) The image cropping device may, in the case where the decided document area is tilted, correct the tilt and crop the document image.

With such a configuration, even in the case where the document is read in the tilted state, the document area can be cropped according to the tilt.

(v) An aspect of the present invention includes a document image reading method that includes: a step in which a computer reads, as the image, the document and the background color plate opposing in the area of the outside of the document; a step of determining the boundary between the document and the background on the basis of the density difference or the color difference between the document and the background color plate in the read image, so as to decide the document area; and a step of applying the document area of the other side to crop the document image in the case where the document area of the one side cannot be decided at the time of reading both of the front and back sides of the document.

The aspect of the present invention includes combinations of any of the above-described plural aspects.

Various modified embodiments of the present invention can be implemented in addition to the above-described embodiments. Such modified embodiments should not be construed as not falling outside the scope of the present invention. The present invention is embodied by the claims and their equivalents, and should embrace all of the modifications within the scope of the above.

What is claimed is:

1. An image reading apparatus comprising:
   an image reading device that reads a document and an area outside the document as an image;
   a background color plate that is exposed to the area outside the document and is read by the image reading device;
   a document area decision device that determines a boundary between the document and the area outside the document on the basis of a density difference or a color difference between the document and the background color plate in the image, so as to decide a document area; and
   an image cropping device that crops a document image from the image on the basis of the document area, wherein
   in the case where both of front and back sides of the document are read and the document area of one of the front and back sides is not decided, the document area decision device applies the document area of the other one of the front and back sides that is read by using the background color plate in a color other than white.

2. The image reading apparatus according to claim 1 further comprising:
   a blank page determination device that performs a blank page determination function to determine whether the document read by the image reading device is a blank page, so as to suppress output of the blank page; and
   a function setting device that accepts a user's setting of whether to validate the blank page determination function, wherein
   the document area decision device decides the document area of each page regardless of whether the document is the blank page in the case where the blank page determination function is valid, and applies the document area of the other one of the front and back sides of each page in the case where the document area of any one of the front and back sides is not decided.

3. The image reading apparatus according to claim 2, wherein the image reading device includes:
- a document transport mechanism that transports the document;
- a first side reading device that reads one of the front and back sides of the document;
- a first-side background color plate that corresponds to the first side reading device and has a position in a gray color and a position in a white color in a surface;
- a second surface reading device that reads the other one of the front and back sides of the document;
- a second-side background color plate that corresponds to the second surface reading device; and
- a reading position switcher that switches a position at which the first side reading device reads the first-side background color plate according to whether the blank page determination function is valid, wherein
- the first-side background color plate has an area in the white color and an area in the gray color in an exposed surface, and
- the reading position switcher switches a reading position of the first side reading device such that a position of the first-side background color plate in the gray color in an area without the document is read at the time when an image cropping function is valid and that a position thereof in the white color is read at the time when the image cropping function is invalid.

4. The image reading apparatus according to claim 1, wherein
- in the case where the decided document area is tilted, the image cropping device corrects the tilt and crops the document image.

5. A document image reading method causing a computer to:
- read, as an image, a document and a background color plate, the background color plate being exposed to an area outside the document;
- determine a boundary between the document and the area outside the document on the basis of a density difference or a color difference between the document and the background color plate in the image, so as to decide a document area; and
- in the case where both of front and back sides of the document are read and the document area of one of the front and back sides is not decided, apply the document area of the other one of the front and back sides to crop a document image by using the background color plate in a color other than white.

* * * * *